INVENTORS
Russell R. Roberts
Jack P. Castellana
Their Attorney

United States Patent Office 3,166,951
Patented Jan. 26, 1965

3,166,951
BRAKE CONTROL MECHANISM
Jack P. Castellana, Churchville, and Russell R. Roberts, West Webster, N.Y., assignors to General Motors Corporation, Detroit, Mich., a corporation of Delaware
Filed July 9, 1962, Ser. No. 208,425
14 Claims. (Cl. 74—531)

This is a continuation-in-part application of our copending application Serial No. 190,349, filed April 26, 1962, now Patent No. 3,136,177 issued June 9, 1964, and entitled "Brake Control Mechanism."

The invention relates to a parking brake control mechanism and more particularly to a mechanism which is silent in operation. The mechanism may be locked in the release position and in any desired brake apply position so as to mechanically hold the brakes of a vehicle in the applied position.

The brake control mechanism disclosed in the above identified application is easy to operate and provides an infinite series of brake apply positions so that the brakes may be either slightly energized or fully energized or intermediately energized. It also operates quietly and releases positively. Mechanisms of this type are adjustable so that as the brake shoes wear the slack may be taken up in the brake actuating cable.

In order to obtain silent actuation and release the invention of the above identified application utilizes a coil brake acting on a brake actuating shaft. The invention to which this continuation-in-part application is directed relates to the coil spring mechanism and its relationship to the locking shaft and mounting bracket bearing surfaces. When the internal diameter of the coil locking and releasing spring of the brake control mechanism is constant throughout the coil length and the outer diameter of the locking shaft or tube is constant throughout its length, insofar as it is exposed to the coil spring, conditions may occur wherein only one or two of the coils forming the locking and releasing spring are active to grip the shaft. This limited gripping action results in an overall loss of gripping force since in the asembly disclosed approximately 10 coils could be active but 8 of them may not be. In order to insure the active gripping action of each of the coils it is proposed to provide a tapered relationship between the coil spring internal diameter and the shaft outer diameter so that the coils are progressively applied in their gripping action until all of them are actively gripping and locking the shaft in position. This tapered relation may be accomplished by tapering the internal diameter of the spring or the outer diameter of the shaft, or both. It is also advantageous in obtaining a smooth gripping and releasing actuation to have several of the coils of the locking and releasing spring completely free of frictional engagement bearing and support surfaces formed as a part of the mounting bracket.

Figures 1, 2:
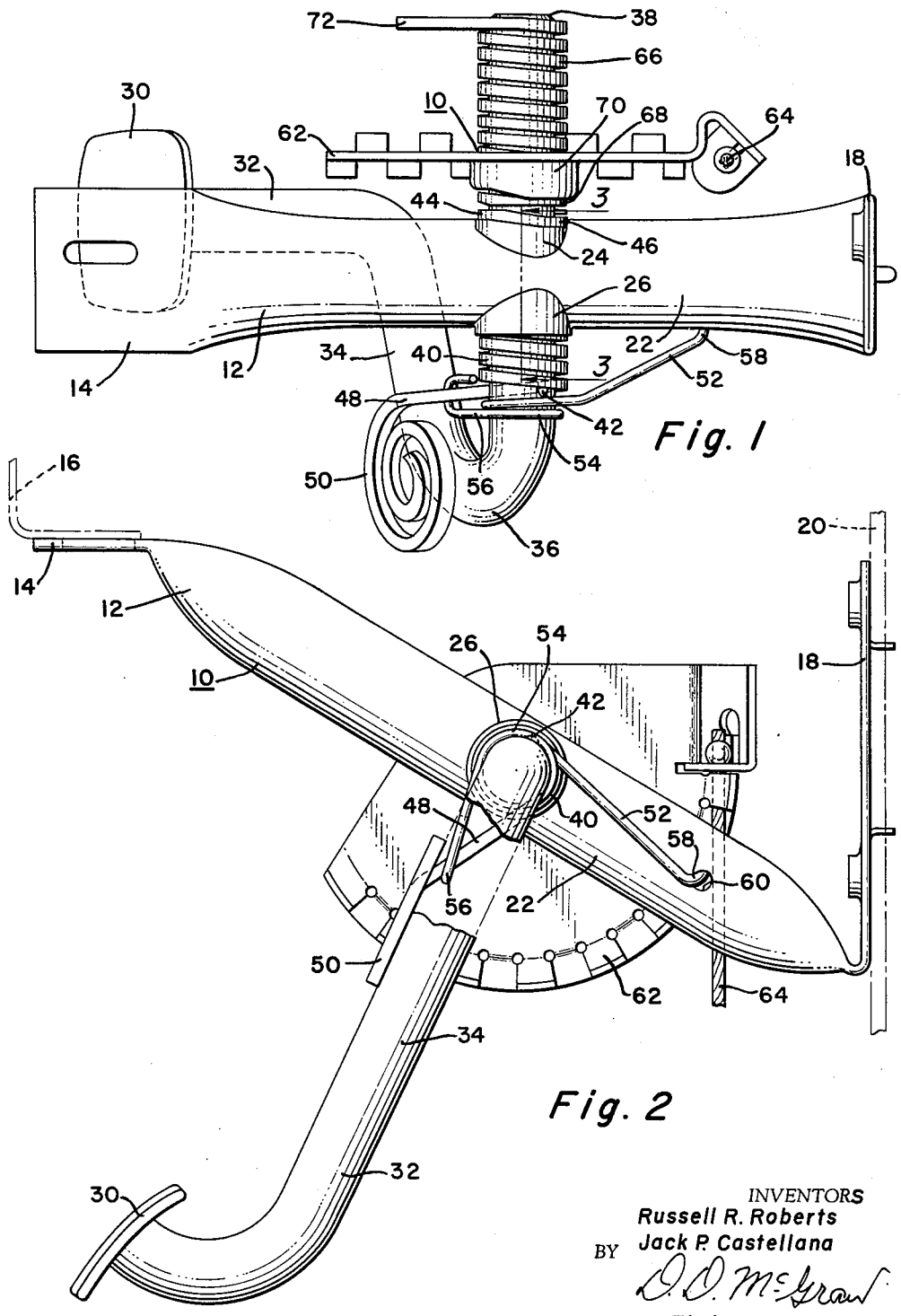
FIGURE 1 is a plan view of a foot actuated and foot released mechanism embodying the invention.
FIGURE 2 is a side elevation of the mechanism of FIGURE 1 showing the mechanism in the brake release position.

The parking brake actuating mechanism 10 illustrated in FIGURES 1 and 2 includes a mounting bracket 12 which is preferably formed as a tubular member with one end 14 being flattened and arranged to be attached to a suitable bracket 16 such as a part of the instrument panel of a vehicle. The other end 18 of mounting bracket 12 is suitably flattened and constructed so as to be attached to the vehicle firewall 20. In the usual left hand drive vehicle it is desirable to mount the mechanism 10 to the left of the vehicle operator immediately adjacent the side of the vehicle, as is well known in the art.

A suitable portion of the tubular section 22 of bracket 12 is provided with transversely extending cylindrical bearing surfaces 24 and 26. These surfaces may be formed from portions of the tubular section 22. The surfaces 24 and 26 have a common axis 28 which preferably extends substantially through the longitudinal axis of tubular section 22 and generally parallel to the ground when the mechanism 10 is mounted in a vehicle.

An apply pedal 30 is provided on the end of an arm 32. This arm has a center section 34 formed to extend generally underneath the tubular section 22 and to one side thereof. Arm 32 is then bent at 36 and has a shaft section 38 formed from the arm end opposite pedal 30. Shaft section 38 is of sufficient length to accommodate other portions of the mechanism to be described and has an axis which, when the shaft is installed in mounting bracket 12, is coincident with the bearing surface axis 28.

Figure 3:
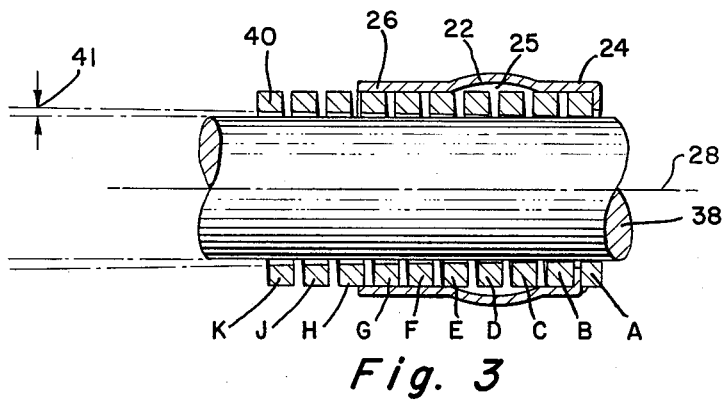
FIGURE 3 is a section view with parts broken away and taken in the direction of arrows 3—3 of FIGURE 1, and shows the coil spring in the released condition.
Figure 4:
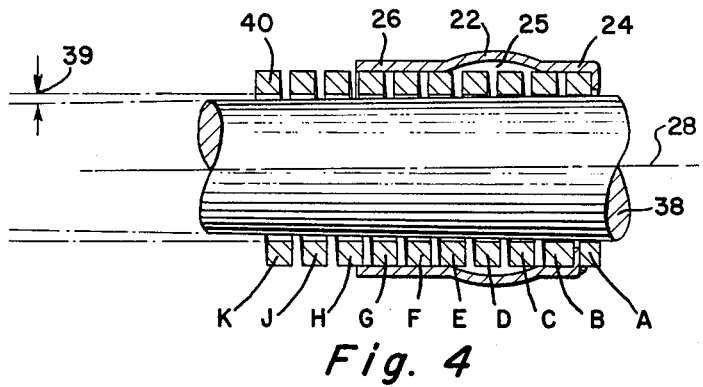
FIGURE 4 is a section view similar to FIGURE 3 and illustrating a modified form of the invention.

A locking and releasing coil spring 40 is tightly wrapped about the portion of shaft section 38 adjacent bend 36. Coil spring 40 is illustrated in FIGURES 3 and 4 when it is in the released position with the coils opened up so that they do not grip the shaft section 38. For convenience the coil spring has been illustrated as having 10 coils which are identified respectively as coils A, B, C, D, E, F, G, H, J and K.

Shaft 38 is prevented from moving axially of coil 40 to a point wherein the shaft axis is no longer a straight line by provision of a stop 42. This stop may be an upset portion of the shaft section 38. It has been found to be mechanically feasible and economically practical to form arm 32 from a tubular member. Shaft section 38 would therefore be a tubular section having a straight axis. Arm 32 may also be formed from bar stock or other suitable material if desired.

Coil spring 40 is inserted through cylinder bearing surface 26 and has an end 44, of which coil A is a part, threaded through a single convolution thread 46 formed in the outer end of the sheet metal forming bearing surface 24. The coil spring end 44 is then suitably secured to tubular section 22 by any suitable means such as hydrogen brazing the two assemblies and subsequently tempering the spring so that it regains its spring characteristics. This tempering operation also increases the strength of the attaching member. Coil spring 40 therefore extends entirely through tubular section 22 and has a free end 48 formed from portions of the spring beyond coil K. This end is located outwardly from bearing surface 26 and adjacent stop 42. The spring free end 48 may be formed to provide a foot release pedal 50. A suitable pad may be mounted on the pedal end of coil 40 if desired. The free end 48 of the coil 40 extends tangentially outward from the underside of the outer surface of shaft section 38 as is seen in the drawings. The cylindrical bearing surfaces 24 and 26 through which spring 40 is received have smaller inner and outer diameters than the inner and outer diameters of the tubular section 22 of mount bracket 12 so that the configuration illustrated in FIGURES 1, 3 and 4 is obtained. In particular, this configuration includes a center section formed of a part of the tubular section 22 which is spaced from some of the coils of spring 40 as illustrated at 25. Therefore there is no frictional engagement of the outer diameter of the coils in this space with any of the bearing surfaces. For example, coils C, D and a part of coil E are illustrated as being free of such engagement. It has been found that, by keeping several coils free from such engagement, a smoother operation of the locking and releasing mechanism is obtained. At the same time several coils must engage the bearing surfaces in order to locate the coils radially and maintain a properly assembled relationship of the entire mechanism. For this reason the cylindrical bearing surfaces 24 and 26 are made with smaller inner and outer diameters than the tubular section 22.

The internal diameter of spring 40 is somewhat smaller than the outer diameter of shaft 38 when the spring is in the free position. As illustrated in FIGURE 3 the internal diameter of spring 40 is tapered so as to begin at coil A and increase so that coil K has the largest internal diameter. The taper 41 is illustrated in an exaggerated form and with the spring 40 in the shaft release condition so that the illustration would not have the spring coils wrapped tightly in gripping relation about the shaft section 38. It has been found that when there is substantially zero clearance between the outer diameter of shaft section 38 and the internal diameter of coil A (the spring being in the open or shaft release condition), the taper may progress so that there is approximately .010 inch clearance at coil K if a shaft section of approximately one inch diameter is utilized. The amount of taper may vary depending upon the material used and the installation requirements. These measurements are therefore given as exemplary and not by way of limitation.

The modification shown in FIGURE 4 accomplishes the same result by tapering the outer diameter of shaft section 38 rather than the internal diameter of the spring 40. This taper is illustrated at 39. Thus the same taper is obtained wherein there is greater clearance at coil K than at coil A, with the intermediate coils having a progressive clearance intermediate these two clearances. Under some conditions it may be desirable to provide tapers on both the spring and the shaft, although this is not considered to be generally necessary.

The spring 40 is preferably manufactured from rectangular stock to provide a greater surface area at the internal spring surface. In order to insert shaft section 38 in the spring 40, the spring free end 48 is moved downwardly in a direction to unwrap or open the coils, thus increasing the internal diameter of the coils and permitting easy insertion of the shaft section through the spring. When the coil free end 48 is released, the coil immediately wraps tightly about the shaft and grips it firmly.

It has also been found desirable under some circumstances to utilize a tolerance take-up spring 52 which cooperates to take up the internal diameter tolerance of spring 40 and assure its gripping action on shaft section 38. For this purpose the spring 52 may be provided. Spring 52 may be formed with a torsion section 54 through which shaft section 38 extends, with the torsion section being positioned outwardly of spring 40 in relation to mounting bracket 12. Spring 52 is provided with a hooked end 56 which engages the free end 48 of spring 40. The other end 58 of spring 52 is anchored to the mounting bracket 12 through the suitable provided aperture 60. The torsional section 54 of spring 52 is oppositely wound from that of spring 40 so that the spring ends 56 and 58 extend tangentially from top side of shaft section 38. It can be seen that the spring action of spring 52 will tend to lift the spring free end 48 thereby further tending to wrap the coiled spring 40 tightly about shaft section 38. This action takes up any tolerance between the inner diameter of the spring and the outer diameter of the shaft section.

Shaft section 38 also extends beyond the bearing surface 24 and the fixed end 44 of spring 40, and has a pulley 62 secured thereto. Pulley 62 is provided to actuate the parking brake cable 64 which in turn actuates the vehicle parking brakes. Cable 64 is normally in tension and tends to rotate pulley 62 in the clockwise direction as seen in FIGURE 2. This tension also tends to rotate shaft section 38 and arm 32 in the clockwise direction about the axis 28.

It has been found desirable to provide an adjusting mechanism for taking up the slack in cable 64 at a point adjacent the parking brake operating mechanism. A mechanism embodying the invention may therefore include structure accomplishing this result. This structure includes the locking and adjusting coil spring 66 which is wrapped about the end of shaft section 38 extending beyond bearing surface 24. The free internal diameter of spring 66 is preferably smaller than the external diameter of shaft section 38 so that the coil is normally locked tightly to the shaft. The internal diameter of spring 66 may be tapered in a manner similar to that of spring 40, or a modification similar to that of FIGURE 4 may be utilized for the same purpose. One coil spring end 68 is fixed to pulley 62 immediately adjacent the fixed end 44 of spring 40. Pulley 62 may be formed with a boss 70 having a single thread formed therein in which spring end 68 is threaded. The spring may then be suitably secured to boss 70 by hydrogen brazing or some other means. If the securing operation includes an elevated temperature condition, the parts may be tempered after being secured together. Spring 66 is also provided with a free end 72 which extends tangentially outward from the spring and from the end of shaft section 38.

When it is desired to adjust the slack in cable 64, free end 72 of spring 66 is rotated so as to unwrap the spring coils sufficiently to release the spring, together with pulley 62, from shaft section 38. The pulley and the spring are then rotated on the shaft until the desired tension is obtained in cable 64. Upon release of the spring end 72 the spring coils immediately wrap tightly about and firmly grip shaft section 38, effectively locking pulley 62 to the end of the shaft section in the adjusted position.

The mechanism is shown in FIGURES 1 and 2 while it is in the brake release position. In order to apply the brake the vehicle operator pushes against pedal 30 to rotate arm 32 counterclockwise, as seen in FIGURE 2, about the shaft section axis 28. Since spring 66 is tightly locked to the shaft section, and the resistance to such movement of the shaft section by cable 64 of the pulley 62 tends to more tightly wrap its coils about the shaft, pulley 62 remains fixed relative to the shaft section 38 and therefore rotates with it in the counterclockwise direction about axis 28. Cable 64 is further tensioned, applying the vehicle parking brakes in an amount commensurate with the movement of arm 32. The counterclockwise rotation of shaft section 38 is permitted by spring 40 since such rotational movement of the shaft section tends to unwind the coils, therefore causing the spring to release shaft section 38. When the operator removes his foot from pedal 30, the tension in cable 64 will act through pulley 62 and spring 66 and try to rotate shaft section 38 and arm 32 in the clockwise direction. This initial movement permits spring 40 to wrap tightly about shaft 38 and to lock the mechanism in the brake apply position. Tolerance take-up spring 52 also acts on spring 40 and tends to wrap it more tightly about shaft 38, further increasing the locking action.

When it is desired to release the mechanism, the vehicle operator pushes the foot release pedal 50, which rotates the free end 48 of spring 40 so as to unwrap the coils from shaft section 38 until the shaft is no longer locked. This is obtained by a progressive unwrapping action. The brake tension in cable 64 then rotates the pulley 62 and, through spring 66, shaft section 38 and arm 32 in the clockwise direction toward the brake release position. The arm 32 will return to the position shown in FIGURE 2 until it either fully relieves the tension in cable 64 or until its center section 34 engages the free end 48 of spring 40. If the foot release pedal 50 is released by the operator it can be seen that any tension remaining in cable 64 will act through arm center section 34 on the spring free end 48 and prevent further clockwise movement of the arm 32 by wrapping the coils of spring 40 more tightly about the shaft section 38. This engaging feature of arm center section 34 with the spring free end 48 is generally not required but is provided as a safety feature.

The disclosed embodiments of the invention provide a quiet and smoothly operating device for actuating a vehicle parking brake system. The unit is positive in action, is easy released and applied, and is economical to manufacture.

We claim:

1. In a vehicle parking brake control mechanism, a mounting bracket, a pedal arm having a shaft attached thereto and rotatably mounted on said mounting bracket, a lock and release coil spring having one end fixed to said mounting bracket and the body thereof wrapped about said shaft and normally gripping said shaft in locking relation and the other end thereof being free, said shaft and said coil spring having a tapered relation between the diameters of the adjacent surfaces thereof, an output member, means adjustably securing said output member to said shaft and including a coiled adjusting spring having one end fixed to said output member and a body portion coiled about said shaft in normal gripping relation thereto and a free end movable to uncoil said adjusting spring sufficiently to permit adjustment of said output member relative to said shaft, and means for connecting said output member to a vehicle parking brake system.

2. The mechanism of claim 1, said mounting bracket having axially spaced bearing surfaces formed thereon in a transverse direction relative to said bracket and receiving said lock and release coil spring therethrough about said shaft in bearing relation with said spaced bearing surfaces, said mounting bracket having a section joining said spaced bearing surfaces with a radial clearance relative to the outer diameter of a plurality of coils of said lock and release coil spring.

3. A control linkage comprising a rotatable output member and a rotatable input member having an outer diameter and a mount rotatably mounting said members, means for locking and releasing said rotatable input member to said mount against one direction of input member rotatable movement and allowing relative input member rotatable movement between said rotatable input member and said mount in the other direction of input member rotatable movement, said means comprising a unidirectional coil brake having one end fixed to said mount and a body portion having throughout the length thereof a tapered internal diameter relative to the outer diameter of said input member and surrounding said input member and locking said input member against one direction of rotation relative to said mount, and means holding said output member in nonrotatable relation to said input member.

4. The control linkage of claim 3, said coil brake having a free end movable to progressively uncoil the coils of said coil brake from said input member sufficiently to permit movement of said input member in any direction relative to said mount.

5. A control mechanism comprising, a mounting bracket, an input shaft received in said bracket, coil spring means comprising a plurality of spring coils and having one end fixed to said bracket and the other end being free and a tapered internal diameter relative to the outer diameter of said shaft, said coil spring means being received about said shaft and said spring coils normally gripping said shaft in a progressive gripping action to lock said shaft nonrotatably in relation to said mounting bracket in one direction of shaft rotation, and an output member including means operatively securing the same to said shaft to move rotatably therewith, said free end of said coil spring means being movable to progressively open said coil spring means and release said shaft from said mounting bracket to permit said shaft to be rotated in the other direction.

6. The mechanism of claim 5, further comprising means operatively connected to said coil spring means free end and actuable to move said free end to progressively release said shaft from the gripping action of said spring coils.

7. The mechanism of claim 6, further comprising a tolerance take-up spring acting on said shaft releasing means and urging said coil spring means free end in a direction to progressively lock said coil spring means to said shaft.

8. The mechanism of claim 5, wherein said means securing said output member to said shaft includes a coil adjusting spring having one end fixed to said output member and a free end and a spring body formed of a plurality of spring coils wrapped in tightly gripping relation about said shaft and having a free spring internal diameter taper relative to the outer diameter of said shaft, said adjusting spring free end being movable to progressively release the gripping action of said adjusting spring coils and permitting adjustment of said output member relative to said shaft.

9. In a control mechanism comprising, a mounting bracket, a rotatable input shaft received in said bracket, locking and releasing coil spring means for said shaft comprising a plurality of coils and having one end thereof fixed to said bracket and the other end thereof being free, and an output member including means operatively securing the same to said shaft to move rotatably therewith, said coil spring means plurality of coils being received about said shaft and normally gripping said shaft to lock said shaft nonrotatably in relation to said bracket in one direction of shaft rotation, said coil spring means free end being movable to radially expand said plurality of coils and release said shaft from said mounting bracket to permit said shaft to be rotated in the other shaft rotatable direction; the improvement wherein the free internal diameters of said plurality of coils are progressively tapered in the diameter increasing direction from said coil spring means fixed end to said coil spring means free end whereby said plurality of coils progressively grip and release said shaft to insure active gripping and releasing action of each of said coils.

10. In a control mechanism comprising, a mounting bracket, a rotatable input shaft received in said bracket, locking and releasing coil spring means for said shaft comprising a plurality of coils and having one end thereof fixed to said bracket and the other end thereof being free, and an output member including means operatively securing the same to said shaft to move rotatably therewith, said coil spring means plurality of coils being received about said shaft and normally gripping said shaft to lock said shaft nonrotatably in relation to said bracket in one direction of shaft rotation, said coil spring means free end being movable to radially expand said plurality of coils and release said shaft from said mounting bracket to permit said shaft to be rotated in the other shaft rotatable direction; the improvement wherein the free internal diameter of said plurality of coils and the external diameter of said shaft are in progressively tapered relation in the taper increasing direction from said coil spring means fixed end to said coil spring means free end whereby said plurality of coils progressively grip and release said shaft to insure an active gripping and releasing action of each coil on said shaft.

11. A shaft lock and release assembly comprising, a mount having spaced axially aligned cylindrical bearings, a lock and release coil spring received in said bearings and having a plurality of coils, an end one of said coils being secured to said mount, each of said bearings having at least one of said coils in bearing contact therewith, at least one of said coils being free of bearing contact with said mount by being positioned intermediate adjacent ones of said bearings, and a shaft coaxially received in said coil spring and having an external diameter throughout the length thereof within said coil spring at least as great as the internal diameter of each of said coils at the adjacent surface of said shaft and each of said coils.

12. The assembly of claim 11, the external diameter of said shaft and the free internal diameter of said plurality of coils having a tapering relation increasing in accordance with the distance of each of said coils from said end coil secured to said mount.

13. The assembly of claim 11, the external diameter of said shaft within said coil spring tapering in a decreasing diameter direction in accordance with the distance of the surfaces thereof adjacent the internal surface of each of said coils from said end coil secured to said mount.

14. The assembly of claim 11, the free internal diameter of said plurality of coils tapering in an increasing diameter direction in accordance with the distance of each of said coils from said end coil secured to said mount.

References Cited by the Examiner

UNITED STATES PATENTS

| | | | |
|---|---|---|---|
| 60,509 | 12/66 | Hanley | 188—82.6 X |
| 2,603,324 | 7/52 | Pepper. | |
| 3,034,624 | 5/62 | Walker. | |
| 3,069,764 | 12/62 | Swats et al. | 74—539 X |

BROUGHTON G. DURHAM, *Primary Examiner.*